US007014006B2

(12) United States Patent
Wielenga

(10) Patent No.: US 7,014,006 B2
(45) Date of Patent: Mar. 21, 2006

(54) SYSTEM AND METHOD FOR MINIMIZING INJURY AFTER A LOSS OF CONTROL EVENT

(75) Inventor: Thomas J. Wielenga, Ann Arbor, MI (US)

(73) Assignee: Dynamotive, LLC, Ann Arbor, MI (US)

( * ) Notice: Subject to any disclaimer, the term of this patent is extended or adjusted under 35 U.S.C. 154(b) by 0 days.

(21) Appl. No.: 10/397,603

(22) Filed: Mar. 26, 2003

(65) Prior Publication Data

US 2003/0217883 A1 Nov. 27, 2003

Related U.S. Application Data

(62) Division of application No. 09/915,835, filed on Jul. 26, 2001, now Pat. No. 6,814,173.

(60) Provisional application No. 60/221,767, filed on Jul. 31, 2000.

(51) Int. Cl.
*B60K 28/10* (2006.01)

(52) U.S. Cl. .................................................... 180/277

(58) Field of Classification Search ................ 180/277, 180/279, 271, 282; 123/198 D; 701/29, 701/112

See application file for complete search history.

(56) References Cited

U.S. PATENT DOCUMENTS

| | | | | |
|---|---|---|---|---|
| 4,087,782 | A | 5/1978 | Oishi et al. | |
| 4,308,536 | A | 12/1981 | Sims et al. | |
| 4,896,924 | A | 1/1990 | Kuwana et al. | |
| 4,934,477 | A | 6/1990 | Dai | |
| 4,966,248 | A | 10/1990 | Farr | |
| 5,172,785 | A * | 12/1992 | Takahashi | 180/271 |
| 5,173,859 | A | 12/1992 | Deering | |
| 5,286,099 | A | 2/1994 | Fujita et al. | |
| 5,418,727 | A | 5/1995 | Ikeda et al. | |
| 5,575,542 | A | 11/1996 | Tanaka et al. | |
| 5,805,103 | A | 9/1998 | Doi et al. | |
| 5,927,830 | A | 7/1999 | Tozu et al. | |
| 6,017,101 | A | 1/2000 | Matsuda | |
| 6,065,558 | A | 5/2000 | Wielenga | |
| 6,076,622 | A * | 6/2000 | Chakraborty et al. | 180/169 |
| 6,105,705 | A | 8/2000 | Faye | |
| 6,267,194 | B1 | 7/2001 | Bullinger et al. | |
| 6,295,500 | B1 * | 9/2001 | Cullen et al. | 701/93 |
| 6,370,461 | B1 | 4/2002 | Pierce et al. | |
| 6,523,912 | B1 | 2/2003 | Bond et al. | |
| 6,612,394 | B1 * | 9/2003 | Wessman | 180/446 |

* cited by examiner

*Primary Examiner*—Faye M. Fleming
(74) *Attorney, Agent, or Firm*—Howard & Howard

(57) ABSTRACT

A system for use with a motor vehicle that minimizes injury after a loss of control event. The motor vehicle has at least one front wheel and at least one rear wheel and an engine. The system includes a control which detects a loss of control event and automatically actuates a brake system and/or a steering system and/or commands an engine controller to reduce power output of an engine.

15 Claims, 3 Drawing Sheets

SYSTEM AND METHOD FOR MINIMIZING INJURY AFTER A LOSS OF CONTROL EVENT

CROSS-REFERENCE TO RELATED APPLICATIONS

This application is a divisional application of U.S. patent application Ser. No. 09/915,835, filed Jul. 26, 2001 now U.S. Pat. No. 6,814,173 which claims priority to U.S. Provisional Patent Application 60/221,767, titled "System for Minimizing Injury After a Collision", filed Jul. 31, 2000.

FIELD OF THE INVENTION

The present invention relates generally to a vehicle control system and method for controlling a motor vehicle, and more particularly, to a vehicle control system and method for detecting the occurrence of a loss of control event and automatically controlling engine, braking and/or steering systems of the motor vehicle.

BACKGROUND OF THE INVENTION

There are many collisions between motor vehicles in which the vehicles involved have substantial velocities after the collision and are subsequently involved in further collisions and/or rollovers. These secondary events may be even more devastating than the initial collision. The remaining kinetic energy of a vehicle after the primary collision may be dissipated in a secondary collision (resulting in injury or loss of life). Other loss of control events, such as driver error, may also result in subsequent collisions.

Most vehicles have an energy absorbing structure within the front end of the vehicle as well as front airbags. It is very common that, as a result of the primary collision, the vehicle is skewed with respect to the path of its motion or it may spin. The result may be either a vehicle rollover or a secondary collision in which the vehicle contacts an obstruction at a point other than the front, thereby bypassing the energy absorbing structure and/or the front airbags are not actuated.

The present invention is aimed at one or more of the problems identified above.

SUMMARY OF THE INVENTION AND ADVANTAGES

In one aspect of the present invention, a system for use with a motor vehicle having at least one front wheel and at least one rear wheel, is provided. The system includes a brake system for applying pressure to resist the rotation of the at least one front wheel and/or the at least one rear wheel, a sensor for detecting an occurrence of a loss of control event of the motor vehicle and responsively producing a loss of control signal, and, a controller for receiving the loss of control signal and automatically actuating the brake system.

In another aspect of the present invention, a system for use with a motor vehicle having an engine, is provided. The system includes an engine control system for controlling the engine, a sensor for detecting an occurrence of a loss of control event of the motor vehicle and responsively producing a loss of control signal, and a controller for receiving the loss of control signal and signaling the engine control system to reduce power output of the engine.

In still another aspect of the present invention, a method for use with a motor vehicle having at least one front wheel and at least one rear wheel and a brake system for applying pressure to resist the rotation of the at least one front wheel and/or the at least one rear wheel, is provided. The method includes the steps of detecting an occurrence of a loss of control of the motor vehicle and automatically actuating the brake system in response to detecting the loss of control event.

In yet another aspect of the present invention, a method for use with a motor vehicle having an engine and an engine control for controlling the engine, is provided. The method includes the steps of detecting an occurrence of a loss of control event of the motor vehicle and signaling the engine control system to reduce power output of the engine in response to detecting the occurrence of the loss of control event.

In a further aspect of the present invention, a system for use with a motor vehicle having at least one front wheel and at least one rear wheel, is provided. The system includes a steering system for controllably steering the at least one front wheel and/or the at least one rear wheel, a sensor for detecting an occurrence of a loss of control event of the motor vehicle and responsively producing a loss of control signal, and a controller for receiving the loss of control signal and automatically actuating the steering system.

In a still further aspect of the present invention, a method for use with a motor vehicle having at least one front wheel and at least one rear wheel and a steering system for controllably steering the at least one front wheel and/or the at least one rear wheel, is provided. The method includes the steps of detecting an occurrence of a loss of control event of the motor vehicle and automatically actuating the steering system in response to detecting the loss of control event.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
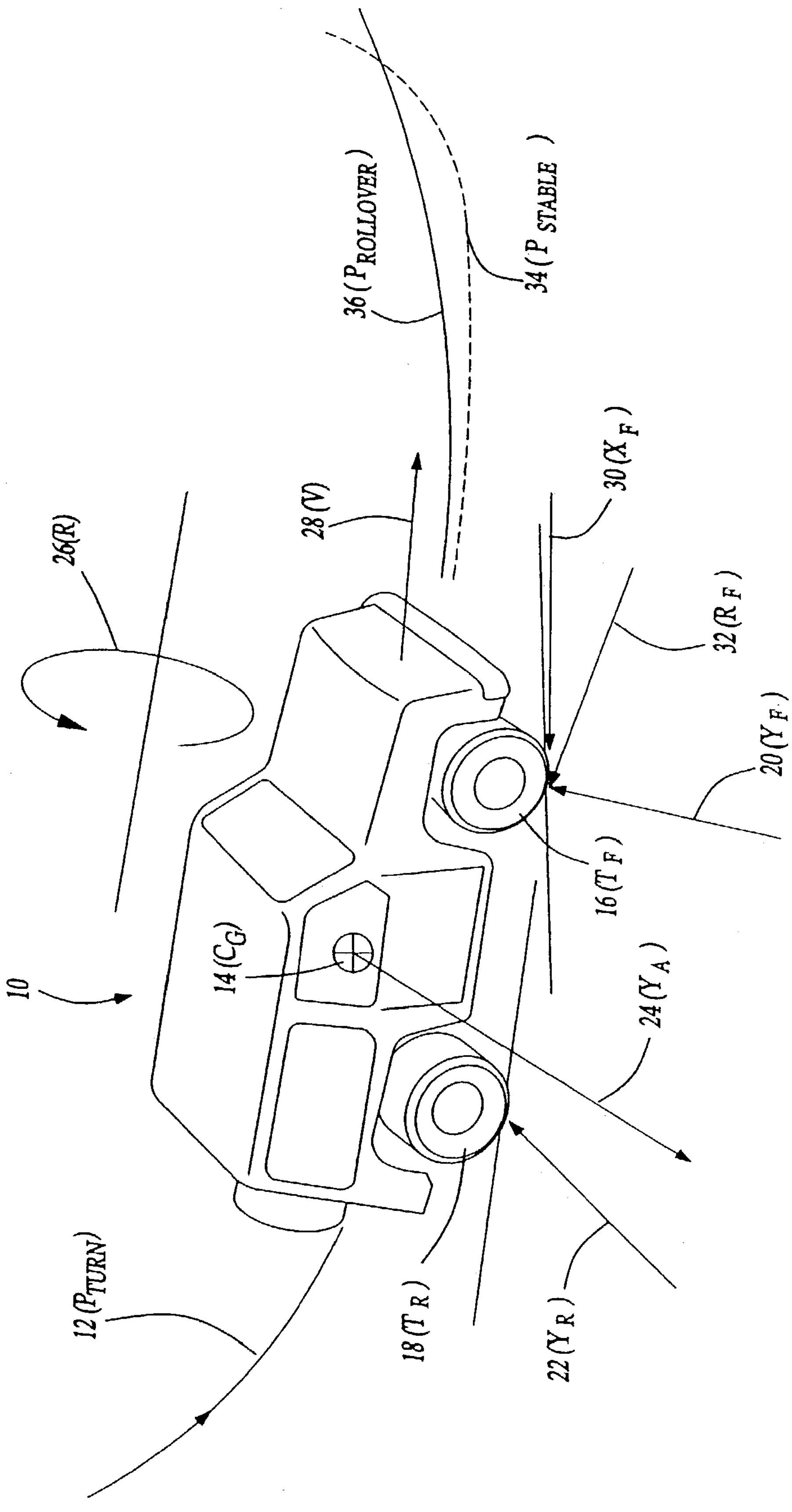
FIG. 1 is a perspective view of a vehicle having a system for minimizing injury after a loss of control event, according to an embodiment of the present invention.

Referring to the Figures, wherein like numerals indicate like or corresponding parts throughout the several views, FIG. 1 shows a perspective view of a motor vehicle 100 with a system 102 for minimizing injury after a loss of control event, such as a collision. The motor vehicle 100 includes first and second front wheels 104 (only one of which is shown) and first and second rear wheels 106 (only one of which is shown). The motor vehicle 100 includes an engine 108 (shown as a box in dotted lines) which is controlled by an operator or driver user via a gas pedal (not shown) in a conventional manner. As shown, the motor vehicle 100 is following a path 110 as dictated by the driver.

Figure 2:
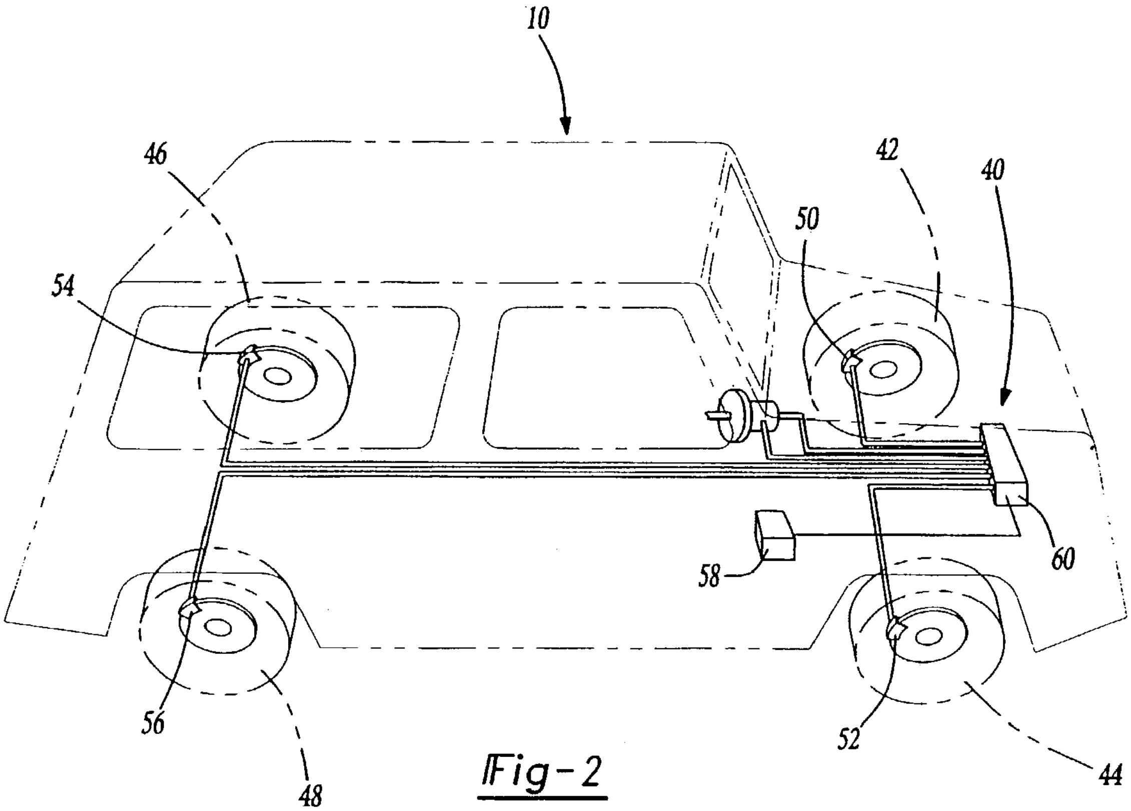
FIG. 2 is a perspective view of the vehicle of FIG. 1 having a brake system, a steering system, and a engine control system.

With reference to FIG. 2, the system 102 includes a brake system 202 for applying pressure to resist the rotation of the front wheels 104 and/or the rear wheels 106. The brake system 202 includes a set of brakes 204, 206, 208, 210 and a controller 212. The brakes 204, 206, 208, 210 apply pressure to resist the rotation of the wheels 104, 106. The controller 212 actuates the brakes 204, 206, 208, 210 in response to driver actuation of a brake pedal (not shown) or via a predetermined program in response to detection of a loss of control event (see below). Similar to conventional traction control brake systems, the control 212 must be capable of actuating the brakes 204, 206, 208, 210 without the depression of the brake pedal. In a preferred embodiment of the present invention, the brake control 212 is also capable of actuating each brake 204, 206, 208, 210 independently.

The system 102 also includes a sensor 214 for detecting an occurrence of a loss of control event of the motor vehicle 100 and responsively producing a loss of control signal. Preferably, the sensor 214 is designed to generate the loss of control signal when a velocity of the motor vehicle 100 changes at a rate greater than a predetermined threshold, i.e., an acceleration of the vehicle is greater than predetermined threshold.

In one embodiment, the sensor 214 includes a yaw rate sensor. The measured yaw rate is compared with a predetermined threshold. The loss of control event is detected when the measured yaw rate is above the predetermined threshold.

Alternatively, a body slip angle can be calculated as a function of the measured yaw rate, and the velocity and lateral acceleration of the motor vehicle 100. The calculated body slip angle is compared with a predetermined threshold. The loss of control event is detected when the calculated body slip angle is greater than the predetermined threshold.

In another embodiment, the sensor 214 includes an accelerometer. In still another embodiment, the sensor 214 is incorporated into an airbag system (not shown) and produces the loss of control signal when the airbag system is triggered. The airbag system may include front and/or side airbags. In still another embodiment, the sensor 214 is a device which measures a body roll angle of the motor vehicle 100. The device used to measure the body roll angle of the motor vehicle 100 may include an accelerometer, a gyroscope, a roll rate sensor or other like sensor.

In a further embodiment, the sensor 214 includes one or more limit switches situated between two members of the motor vehicle 100. The two members are chosen such that the members close or collapse towards one another during a collision thereby closing the limit switch.

In one embodiment, the controller 212 is adapted to receive the loss of control signal and automatically actuate one or more of the brakes 204, 206, 208, 210. In the preferred embodiment, the brake system 202 actuates all four brakes 204, 206, 208, 210 in response to receiving the loss of control signal. Actuation of the brakes 204, 206, 208, 210, allows the brakes 204, 206, 208, 210 to absorb some or all of the kinetic energy of the motor vehicle 100 after the loss of control event or primary collision.

Figure 3:
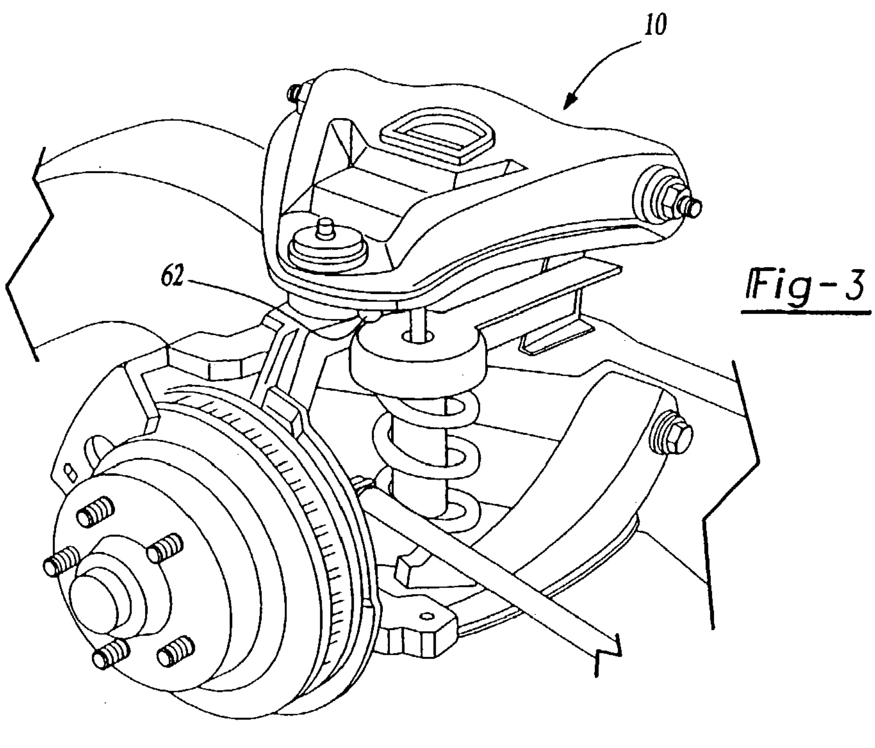
FIG. 3 is a perspective view of the vehicle of FIG. 1 after a primary collision.

In another embodiment, the system 102 is adapted to attempt to reorient the motor vehicle 100 after the loss of control event or first of primary collision. With respect to FIG. 3, which shows the motor vehicle 100 after a primary collision and prior to a second collision with an obstruction 300. i.e., a stationery object or another vehicle (moving or stationery). After the primary collision, the motor vehicle 100 is orientated in a direction and following a path as illustrated by a first arrow 302. If this path is sharp enough, the vehicle 100 may rollover. Even if the vehicle 100 does not rollover, the vehicle 100 may collide with the obstruction 300 on its side or offset from the front of the vehicle, thus, increasing the risk of harm to passengers within the vehicle. Thus, the system 102 attempts to reorient the vehicle 100 such that the vehicle 100 returns to its original path, as illustrated by a second arrow 304 by actuating all or some of the brakes 204, 206, 208, 210. For example, in order to reorient the vehicle 100 to its original path, as shown in FIG. 3, the system may reduce actuation of the rear brakes 208, 210 or apply less brake force to the rear wheels 106.

The motor vehicle 100 also includes a steering system 216 for controllably steering the front wheels and/or the rear wheels 104, 106. Preferably, the steering system 216 controls the front wheels 104. In another embodiment, the system 102 attempts to reorient the vehicle 100 through actuation of the brake system 202 and/or the steering system 216. In other words, the system 102 attempts to return the motor vehicle 102 to its original path 304 by directly controlling direction of the front wheels 104 through the steering system 216. The steering system 216 must be capable of controlling the direction of the front wheels 104 independent of the actuation of a steering wheel (not shown). One type of such a system is a drive or steer-by-wire system. Such systems are well known in the art and are thus not further discussed. After detection of the loss of control event, the controller 212 sends a command to the steering system 216 to reorient the vehicle 100.

The motor vehicle 100 also includes an engine control system 218 for controllably actuating the engine 108. In one embodiment, the controller 212 is adapted to reduce power output of the engine 108 in response to receiving the loss of control signal. Preferably, after detecting the loss of control event, the controller 212 sends a command signal to the engine control system 218 to reduce the power output of the engine 108.

The engine control system 218 may also implement a cruise control function which maintains a desired vehicle velocity set by the driver. In another embodiment, the controller 212 is adapted to cancel the cruise-control function (if engaged) in response to receiving the loss of control signal. Preferably, after detecting the loss of control event, the controller 212 sends a command signal to the engine control system 218 to cancel the cruise-control function.

The motor vehicle 100 may also include an energy absorbing structure 112. Preferably, the energy absorbing structure 112 includes a bumper 114 and/or airbags and/or structural arrangements within the motor vehicle 100 designed to absorb energy during a collision and/or the like. In one embodiment, the controller 212 is adapted to reorient the motor vehicle 100 such that the energy absorbing structure 112 absorbs energy from a subsequent collision. Preferably, the controller 212 is adapted to reorient the motor vehicle 100 such that the energy absorbing structure 112 is between passengers in the motor vehicle 100 and objects within the path of the motor vehicle 100.

Figure 4:
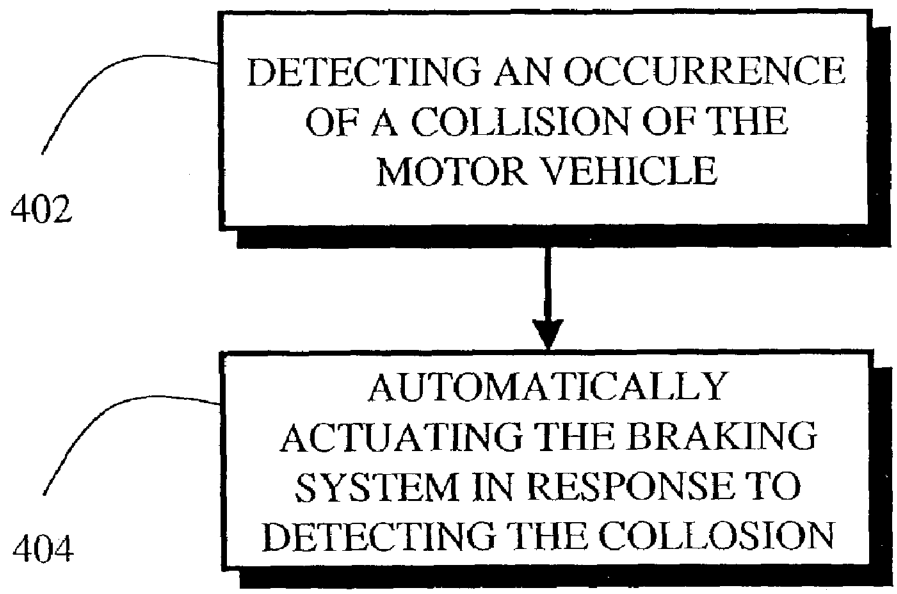
FIG. 4 is a flow diagram illustrating operation of the system of FIG. 1, according to an embodiment of the present invention; and, FIG. 5 is a flow diagram illustration operation of the system of FIG. 1, according to another embodiment of the present inventions.

With reference to FIG. 4, a method according to an embodiment of the present invention, operation of the system 102 will now be discussed. In a first control block 402, an occurrence of a loss of control event of the motor vehicle 100 is detected. In a second control block 404, the brake system 202 is automatically actuated in response to detection of the loss of control event.

Figure 5:
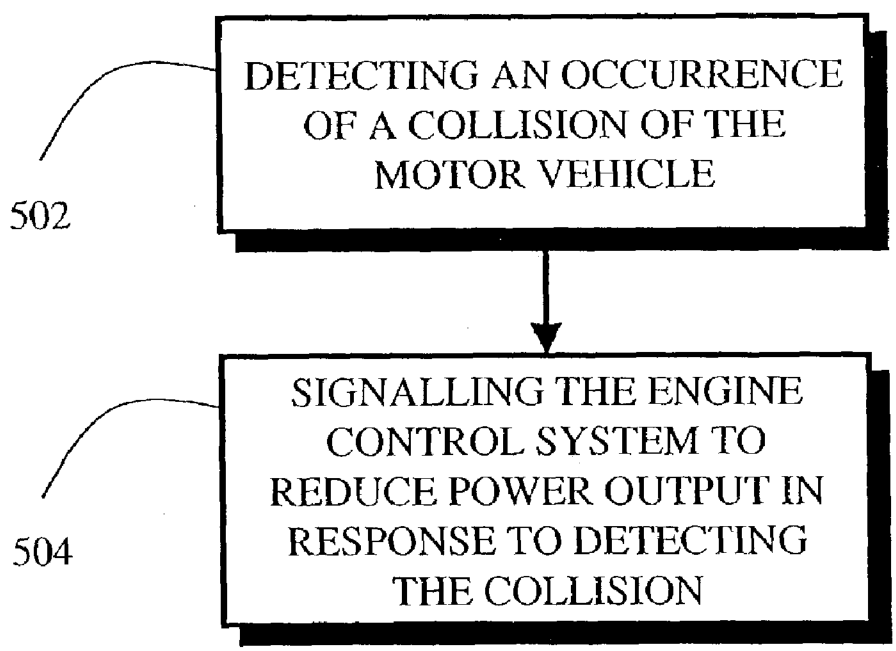

With reference to FIG. 5, a method according to another embodiment of the present invention, operation of the system 102 will now be discussed. In a first control block 502, an occurrence of a loss of control event of the motor vehicle 100 is detected. In a second control block 404, the engine control system 218 automatically reduces a power output of the engine 108 in response to detecting the occurrence of the loss of control event.

Obviously, many modifications and variations of the present invention are possible in light of the above teachings. The invention may be practiced otherwise than as specifically described within the scope of the appended claims.

What is claimed is:

1. A system for use with a motor vehicle having an engine, comprising:

an engine control system for controlling the engine;

a sensor for detecting an occurrence of a loss of control event of the motor vehicle and responsively producing a loss of control signal, the loss of control event being a loss of directional control; and, a controller for receiving the loss of control signal and signaling the engine control system to reduce power output of the engine.

2. A system, as set forth in claim 1, wherein the loss of control event is a collision.

3. A system, as set forth in claim 1, wherein the engine control system includes a cruise control function.

4. A system, as set forth in claim 3, wherein the controller is adapted to signal the engine control system to disable the cruise control function.

5. A system, as set forth in claim 1, wherein the controller is integrated with the engine control system.

6. A system, as set forth in claim 1, wherein the sensor includes an accelerometer.

7. A system, as set forth in claim 1, wherein the sensor is included in an air bag system.

8. A method for use with a motor vehicle having an engine and an engine control for controlling the engine, including the steps of:

detecting an occurrence of a loss of control event of the motor vehicle, the loss of control event being a loss of directional control; and, signaling the engine control system to reduce power output of the engine in response to detecting the occurrence of the loss of control event.

9. A method, as set forth in claim 8, wherein the loss of control event is a collision.

10. A method, as set forth in claim 8, wherein the engine control system includes a cruise control function.

11. A method, as set forth in claim 10, including the step of signaling the engine control system to disable the cruise control function in response to detecting the occurrence of the loss of control event.

12. A system for use with a motor vehicle having at least one front wheel and at least one rear wheel, comprising:

a steering system for controllably steering the at least one front wheel and/or the at least one rear wheel;

a sensor for detecting an occurrence of a loss of control event of the motor vehicle and responsively producing a loss of control signal, the loss of control event being a loss of directional control; and, a controller for receiving the loss of control signal and automatically actuating the steering system.

13. A system, as set forth in claim 12, wherein the loss of control event is a collision.

14. A method for use with a motor vehicle having at least one front wheel and at least one rear wheel and a steering system for controllably steering the at least one front wheel and/or the at least one rear wheel, the method comprising:

detecting an occurrence of a loss of control event of the motor vehicle, the loss of control event being a loss of directional control; and, automatically actuating the steeling system in response to detecting the loss of control event.

15. A method, as set forth in claim 14, wherein the loss of control event is a collision.

* * * * *

UNITED STATES PATENT AND TRADEMARK OFFICE

CERTIFICATE OF CORRECTION

PATENT NO. : 7,014,006 B2
APPLICATION NO. : 10/397603
DATED : March 21, 2006
INVENTOR(S) : Wielenga It is certified that error appears in the above-identified patent and that said Letters Patent is hereby corrected as shown below:

Column 6, line 34, after "actuating the" please delete [steeling] and insert therein --steering--.

Signed and Sealed this

Fifteenth Day of August, 2006

JON W. DUDAS

*Director of the United States Patent and Trademark Office*